US012592013B2

(12) United States Patent
Zhang et al.

(10) Patent No.: US 12,592,013 B2
(45) Date of Patent: Mar. 31, 2026

(54) REAL SCENE IMAGE EDITING METHOD BASED ON HIERARCHICALLY CLASSIFIED TEXT GUIDANCE

(71) Applicant: Hangzhou Dianzi University, Hangzhou City (CN)

(72) Inventors: Hua Zhang, Hangzhou City (CN); Lingjun Zhang, Hangzhou City (CN); Tingcong Ye, Hangzhou City (CN); Yanping Xu, Hangzhou City (CN); Yifan Wu, Hangzhou City (CN); Muwei Wang, Hangzhou City (CN); Yizhang Luo, Hangzhou City (CN)

(73) Assignee: Hangzhou Dianzi University, Hangzhou City (CN)

( * ) Notice: Subject to any disclaimer, the term of this patent is extended or adjusted under 35 U.S.C. 154(b) by 330 days.

(21) Appl. No.: 18/483,238

(22) Filed: Oct. 9, 2023

(65) Prior Publication Data

US 2025/0005825 A1     Jan. 2, 2025

(30) Foreign Application Priority Data

Jun. 30, 2023     (CN) .......................... 202310793941.4

(51) Int. Cl.
*G06K 9/00*     (2022.01)
*G06F 40/40*     (2020.01)
(Continued)

(52) U.S. Cl.
CPC .............. *G06T 11/60* (2013.01); *G06F 40/40* (2020.01); *G06T 11/10* (2026.01); *G06V 10/774* (2022.01); *G06V 10/82* (2022.01); *G06V 20/70* (2022.01)

(58) Field of Classification Search
CPC ................... G06T 11/60; G06T 11/001; G06T 2207/20084; G06T 2207/20081;
(Continued)

(56) References Cited

U.S. PATENT DOCUMENTS

2024/0135611 A1*     4/2024     Costin ..................... G06T 11/60
2024/0221281 A1*     7/2024     Abdal ..................... G06V 10/82

OTHER PUBLICATIONS

Liu, Jingyu, et al. "Clip-layout: Style-consistent indoor scene synthesis with semantic furniture embedding." arXiv preprint arXiv:2303. 03565 ( Mar. 2023). (Year: 2023).*
(Continued)

*Primary Examiner* — Gregory A Morse
*Assistant Examiner* — Owais I Memon
(74) *Attorney, Agent, or Firm* — WCF IP

(57)     ABSTRACT

Provided is a real scene image editing method based on hierarchically classified text guidance, including: firstly selecting a hierarchical multi-label text classification model and hierarchically classify an input style description text; obtaining a latent vector of an indoor scene image and dividing the latent vector; training latent space residual mappers which are divided into four groups for generating details of a layout, an object, an attribute, and a color in the scene image, and selectively training a mapping model with a secondary word obtained by a text classification model; inputting a tertiary word obtained by the text classification model to a contrastive language-image pre-training (CLIP) network and controlling training of the mapping network by utilizing a CLIP loss; hierarchically inputting the latent vector to the mapping network to obtain a bias vector, summing the bias vector with an original vector for inputting to the StyleGAN to obtain an edited image.

3 Claims, 2 Drawing Sheets

(51) Int. Cl.
  *G06T 11/10*      (2026.01)
  *G06T 11/60*      (2006.01)
  *G06V 10/774*     (2022.01)
  *G06V 10/82*      (2022.01)
  *G06V 20/70*      (2022.01)

(58) Field of Classification Search
  CPC ....... G06T 5/77; G06T 2200/24; G06F 40/40;
       G06F 40/30; G06F 18/24; G06V 10/774;
       G06V 10/82; G06V 20/70; Y02D 10/00;
           G06N 3/0475; G06N 3/094; G06N
             3/0464; G06N 3/045; G06N 3/08
  See application file for complete search history.

(56)                    References Cited

OTHER PUBLICATIONS

Pang, Hong-Wing, et al. "Neural scene decoration from a single photograph." European Conference on Computer Vision. Cham: Springer Nature Switzerland, 2022. (Year: 2022).*

Nichol, Alex, et al. "Glide: Towards photorealistic image generation and editing with text-guided diffusion models." arXiv preprint arXiv:2112.10741 (2021). (Year: 2021).*

* cited by examiner

REAL SCENE IMAGE EDITING METHOD BASED ON HIERARCHICALLY CLASSIFIED TEXT GUIDANCE

CROSS REFERENCE TO RELATED APPLICATION

This patent application claims the benefit and priority of Chinese Patent Application No. 2023107939414, filed with the China National Intellectual Property Administration on Jun. 30, 2023, the disclosure of which is incorporated by reference herein in its entirety as part of the present application.

TECHNICAL FIELD

The present disclosure relates to the fields of hierarchical semantic representation of a generative adversarial network (GAN), inverse mapping and hierarchical text classification of an image, and text guided image editing, and in particular, to a method for editing a latent vector of a real indoor scene image after inverse mapping using a hierarchical text classification model and a contrastive language-image pre-training (CLIP) model by inputting an abstract style text into an image generation model.

BACKGROUND

An existing image editing method includes using a pre-trained classifier to learn an interface, and in combination with a GAN, moving a latent vector of an image in a direction to achieve the purpose of image manipulation. Such a method relies to a large extent on an assumption that a latent space is completely disentangled, and further requires manual adjustment of parameters, such as manipulation strength. It has been proposed that a match position of a style image is manipulated to edit a specific region of an image. That is to say, a position in an image to be replaced is selected, and an image generation network is used to synthesize a new image. However, this method requires manual selection of a region needing to be altered and is complicated to operate. Recently, there are also some methods for controlling a human face image change by a text. Since the human face structure is relatively simple, a good effect is achieved.

Recently, using a text to guide image editing has made a rapid progress and received attention. TediGAN is to map an image and a text to a shared StyleGAN latent space and use the text to control the latent vector of the image. FEAT introduces an attention module, matches an input text with an image, learns an attention mask, and uses a GAN to realize text guided image editing. Since a diffusion model is widely used, some text guided image editing methods based on denoising diffusion model also have achieved good effects, such as DALLE and DiffusionCLIP, which further improve the generation performance of a text to an image.

In recent years, GANs have been developed rapidly and are very successful in the field of high-quality image generation. Specifically, StyleGAN is one of famous GAN models, which can generate a high-fidelity image. Moreover, it is found by study that StyleGAN further provides a semantically rich latent space, and different network layers are semantically different. As mentioned in HiGAN, in scene image generation, a bottom layer of StyleGAN controls layout synthesis, followed by objects and attributes, and a high layer controls colors. Moreover, these layered latent spaces have a disentanglement characteristic. This marks it possible to utilize a pre-trained model to edit a composite image and a real image.

In conclusion, existing text guided image editing methods further have some problems. Most methods are very complicated to operate for real applications and need to input a specific text description to realize image content manipulation. Due to the complexity and diversity of a scene image, there are few studies on text guided real scene image editing at present, and most methods are studies on human face images. Therefore, the present disclosure is to provide a real scene image editing method based on hierarchically classified text guidance. This method realizes visual text based image operation by means of a recently proposed CLIP model, and the operation does not need to pre-train a direction of the operation and also does not need to manually select an image position to be manipulated. The CLIP model is a model for pre-training using 400 million pairs of image-text data on a network. Since a natural language is capable of expressing a more extensive visual concept, the method combines the hierarchical semantic characteristics of the CLIP and the StyleGAN and hierarchically classifies an input text description by utilizing a hierarchical text classification model, and the classification result is utilized in hierarchical training of a StyleGAN mapping network and semantic control on a real image. Thus, the purpose of more automatic manipulation on a real scene image can be achieved by means of an abstract text description.

SUMMARY

In view of the above-mentioned problems, the present disclosure provides a real scene image editing method based on hierarchically classified text guidance. Based on hierarchical semantic representation of StyleGAN and image manipulation by a text, a cross-modal real indoor scene editing method is designed, which may be described by an abstract style text, allowing a real indoor scene to have features of the style with no change in inherent attribute characteristics. The method may be used in practical applications such as indoor decoration design. The technical solution of the present disclosure includes the following steps.

step 1: selecting a hierarchical multi-label text classification model, inputting a primary word $t_1$ to the hierarchical multi-label text classification model to hierarchically classify an indoor style description, where an output of the hierarchical multi-label text classification model is set with three levels: the primary word $t_1$ is an abstract style description; a secondary word $t_2$ is a composition description of a scene image; and a tertiary word $t_3$ is a detailed description corresponding to an abstract style;

the composition description includes a layout, an abstract, an attribute, and a color; and the detailed description includes specific descriptions of the layout, the abstract, the attribute, and the color;

step 2: utilizing an e4e inversion model to obtain a latent vector w of an indoor image trained in a large-scale scene understanding (LSUN) dataset, w∈W+, W+ representing a vector space; and segmenting the latent vector w based on a semantic hierarchical characteristic of StyleGAN and in combination with the secondary word $t_2$ obtained in step 1; and step 3: training a plurality of latent space residual mappers, where since different StyleGAN layers are known to generate details of different levels in the scene image, the plurality of latent space residual mappers are divided into four groups, each group including a single latent space residual mapper, and the four groups are configured to correspondingly generate details of the layout, the abstract, the attribute, and the color; and realizing manipulation on a real scene image with a visual abstract text by utilizing the tertiary word $t_3$ obtained in step 1 and a CLIP model.

The present disclosure has the following beneficial effects:

By training a hierarchical multi-label text classification model, an input style description text is hierarchically classified to transform an abstract word into a specific text description, which is used for training a mapping network on the one hand and used as a text input to a CLIP model on the other hand. Thus, the purpose of more automatic model training is achieved and too much manual manipulation is not needed.

By utilizing a semantic hierarchical characteristic of StyleGAN, different mapping networks are trained for different semantics of different layers in a scene image. The purposes of training only the mapping networks with a need to change corresponding semantics of an input image and maintaining other elements of the input image unchanged are achieved, thus improving the model training efficiency and reducing desired resources.

DETAILED DESCRIPTION OF THE EMBODIMENTS

The specific embodiments of the present disclosure are further described in detail below with reference to the accompanying drawings.

Figure 1:
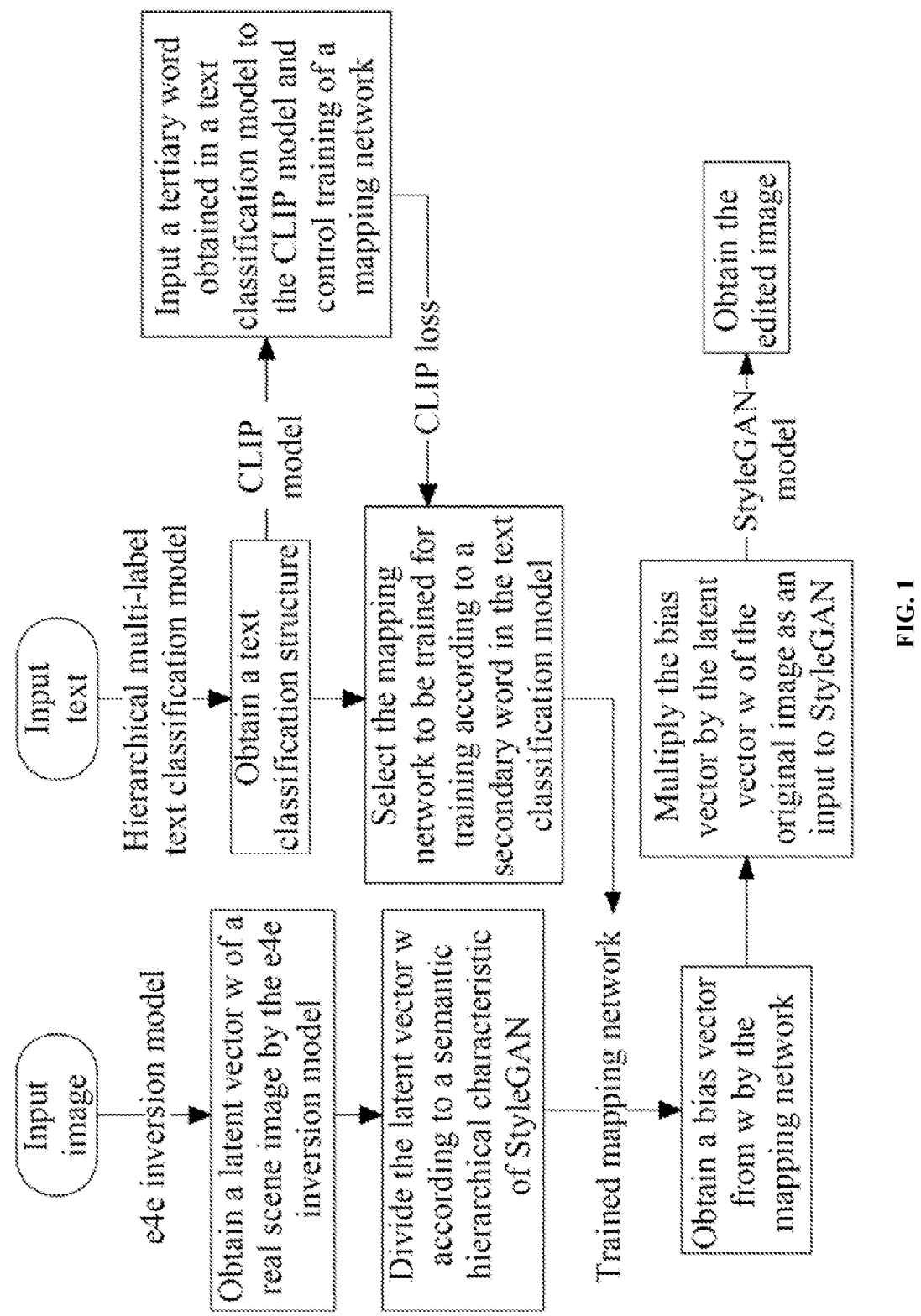
FIG. 1 is a flowchart of a method according to the present disclosure.
Figure 2:
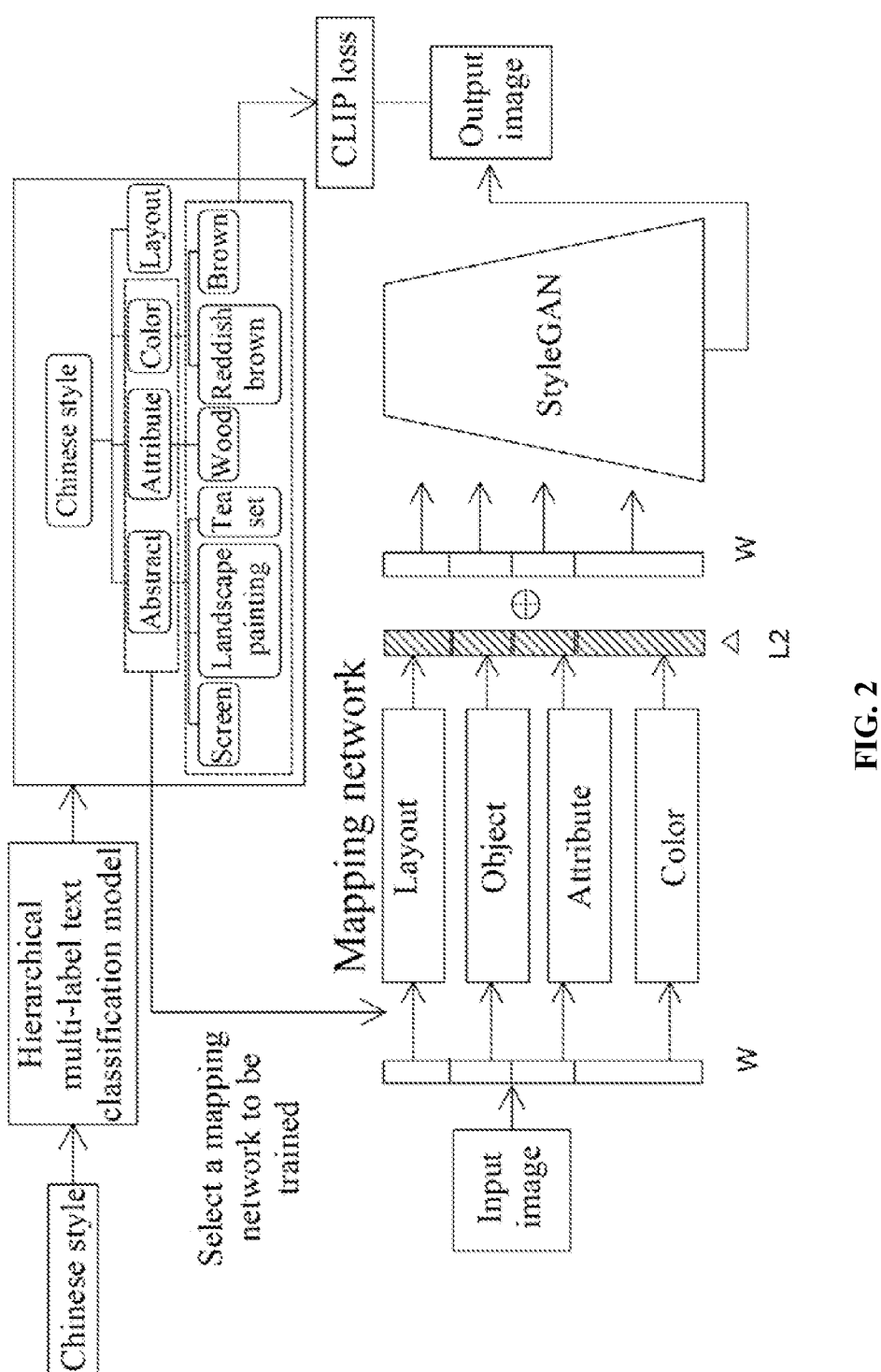
FIG. 2 is a schematic diagram of the present disclosure.

As shown in FIG. 1 and FIG. 2, the present disclosure provides a real scene image editing method based on hierarchically classified text guidance, in which an abstract text description is transformed into a specific text description by utilizing a hierarchical multi-label text classification model; and an automatic text manipulated image editing network model is designed based on a hierarchical semantic representation feature of StyleGAN.

According to the present disclosure, firstly, a hierarchical multi-label text classification model is selected to hierarchically classify an input style description text, thereby obtaining an expansion from an abstract word to a specific word description. An e4e inversion model is utilized to obtain a latent vector of an indoor scene image and the latent vector is divided based on a semantic hierarchical characteristic of StyleGAN. Latent space residual mappers are trained and divided into four groups for generating details of a layout, an object, an attribute, and a color in the scene image, and a mapping model is selectively trained with a secondary word obtained by a text classification model. A tertiary word obtained by the text classification model is input to a CLIP network and training of the mapping network is controlled by utilizing a CLIP loss. The latent vector is hierarchically input to the mapping network to obtain a bias vector, and the bias vector is summed with an original vector and then input to the StyleGAN to obtain an edited image.

Specific implementation steps of the present disclosure are as follows:

Step 1: a hierarchical multi-label text classification model is selected. An input text is a description of a decoration style of an indoor scene, such as Nordic style, Chinese style, and simple style. After model training, a three-level text classification structure as shown in FIG. 2 is obtained, where a primary word is an input abstract style description $t_1$; a secondary word $t_2$ is a different component element of a scene image, and a "layout", an "abstract", an attribute", and a "color" are included in the present method; and a tertiary word $t_3$ is a specific description of an abstract style, such as "screen", "log", and "reddish brown" corresponding to the Chinese style.

EURLEX57K is a large hierarchical multi-label text classification dataset including 57 k European Union legislation documents and having about 4.3 k marked European word labels. A label set is divided into a zero-sample label, a less-sample label, and a frequent label. The less-sample label refers to a label occurring at a frequency of less than or equal to 50 in a training set, and the frequent label refers to a label occurring at a frequency of greater than 50 in the training set. The method uses the EURLEX57K dataset to train the hierarchical multi-label text classification model.

Specific implementation steps of step 1 are as follows:

1-1, based on an image convolution network, a text encoder and a label encoder are utilized to extract text semantic $S_t$ and label semantic $S_l$, as shown in the following formulas, respectively, by sharing a hierarchical structure relationship representation E learned in a label set, where $V_t$ represents a set of hierarchical structure nodes, which is obtained by using a text description as an input, obtaining a text feature T obtained by bidirectional gate recurrent unit (GRU) and convolutional neural network (CNN) layers, and subjecting the text feature to linear transformation; $V_l$ represents a set of label nodes, which is obtained by using the label set as an input and performing average calculation on pre-trained label inputs; and $\sigma$ represents an activation function ReLU.

$$S_t = \sigma(E \cdot V_t)$$
$$S_l = \sigma(E \cdot V_l)$$

1-2, the text semantic $S_t$ and the label semantic $S_l$ are projected into a joint embedding space, where a joint embedding loss controls a similarity between the text semantic $S_t$ and the label semantic $S_l$.

1-3, by matching a learning loss, training is performed to obtain a fine-grained label semantic, a coarse-grained label semantic, and incorrect label semantics, where the fine-grained label semantic is closest to the input tertiary word $t_3$; the fine-grained label semantic is $t_3$; the coarse-grained label semantic is $t_2$; and other incorrect label semantics are far away from the primary word $t_1$.

1-4, with the trained hierarchical multi-label text classification model, the primary word $t_1$ is input to obtain the desired tertiary word $t_3$ and the secondary word $t_2$.

Step 2: based on an e4e model trained on an LSUN dataset, a real image is mapped to a latent space w (w∈W+); and by utilizing the interpretability of hierarchical semantics of the StyleGAN, i.e., different network layers corresponding to different semantics generated in the image (which has been verified in HiGAN), the inverted latent space is divided.

LSUN is a large-scale scene understanding image dataset including images of 10 scene categories and images of 20 object categories. The scene categories mainly include scene images of bedrooms, drawing rooms, classrooms, and the like. For the training data, each category includes a large number of images, ranging from 120,000 to 3,000,000. The validation data includes 300 images, and each category of the test data has 1000 images.

Specific implementation steps of step 2 are as follows:

2-1, the e4e model trained on the LSUN dataset is utilized to obtain an inverse latent vector w of a real indoor scene in a format of .pt file as an input to the StyleGAN.

2-2, the obtained latent vector w is divided according to the semantic hierarchical characteristic of the StyleGAN, where the layout corresponds to [0,2) layer of a generative network; the object corresponds to [2,6) layer of the generative network; the attribute corresponds to [6,12) layer of the generative network; and the color corresponds to [12,14) layer of the generative network.

Step 3: Latent space residual mappers are trained, and a CLIP model is combined with StyleGAN2 to obtain a new edited real scene image described by the abstract text.

Specific implementation steps are as follows:

3-1, it has been indicated that different StyleGAN layers generate details of different levels in the scene image, and therefore, four latent space residual mappers are divided into four groups, which correspond to the layout, the abstract, the attribute, and the color, respectively, and a different part of the latent vector w is provided for each group.

Each latent space residual mapper group is selectively trained according to the secondary word $t_2$ obtained in step 1, where the latent space residual mapper groups corresponding to words not included in the secondary word $t_2$ are not trained.

3-2, the latent vector of an input image is represented as $w=(w_l, w_o, w_p, w_c, w_0)$, where $w_l$, $w_o$, $w_p$, $w_c$, and $w_0$ represent divisions of w according to different layers, where $w_l$ corresponds to a vector part corresponding to the layout layer; $w_o$ corresponds to a vector part corresponding to the abstract layer; $w_p$ corresponds to a vector part corresponding to the attribute layer; $w_c$ corresponds to a vector part corresponding to the color layer; $w_0$ represents a residual part after the division of the latent vector w; and since the StyleGAN network has a total of 18 layers, the divided groups are first 14 layers. $M(w)=(M_1(w_l), M_2(w_o), M_3(w_p), M_4(w_c), w_0)$ is obtained by means of the latent space residual mappers, where $M_1$, $M_2$, $M_3$, and $M_4$ represent groups of a mapping network, respectively.

3-3, after training the latent space residual mappers under the influence of a CLIP loss, a resulting bias vector $\Delta$ is multiplied by an initial latent vector w of the image to realize editing of the latent vector w, and other semantic content in the input image is maintained unchanged. The CLIP loss is capable of minimizing a cosine distance of a generated image and a text prompt:

$$L_{CLIP}(w) = D_{CLIP}(G(w + M(w)), t_3),$$

where G represents a StyleGAN generator. To maintain some visual attributes of the original input image, the latent space after the mapping is constrained by using an L2 norm. Therefore, a final loss function is expressed as:

$$L(w) = L_{CLIP}(w) + \|M(w)\|_2.$$

3-4, the edited latent vector w+M(w) is input to the StyleGAN network, and the edited image is finally output.

The present disclosure allows for mapping of abstract words to specific words by utilizing the semantic hierarchical characteristic of the StyleGAN and the hierarchical multi-label text classification model, and realizes automatic editing of a text guided image and reduces manual manipulation. By selectively training the mapping network, the training efficiency is also improved. Not only is the training time shortened, but also unwanted resource waste is avoided.

What is claimed is:

1. A real scene image editing method based on hierarchically classified text guidance, comprising:

step 1: selecting a hierarchical multi-label text classification model, inputting a primary word $t_1$ to the hierarchical multi-label text classification model to hierarchically classify an indoor style description, wherein an output of the hierarchical multi-label text classification model is set with three levels: the primary word $t_1$ is an abstract style description; a secondary word $t_2$ is a composition description of a scene image; and a tertiary word $t_3$ is a detailed description corresponding to an abstract style;

the composition description comprises a layout, an abstract, an attribute, and a color; and the detailed description comprises specific descriptions of the layout, the abstract, the attribute, and the color;

step 2: utilizing an e4e inversion model to obtain a latent vector w of an indoor image trained in a large-scale scene understanding (LSUN) dataset, $w \in W+$, W+ representing a vector space; and segmenting the latent vector w based on a semantic hierarchical characteristic of StyleGAN and in combination with the secondary word $t_2$ obtained in step 1;

wherein step 2 specifically comprises:

2-1, utilizing an e4e model trained on the LSUN dataset to obtain an inverse latent vector w of a real indoor scene in a format of .pt file as an input to the StyleGAN; and 2-2, dividing the obtained latent vector w according to the semantic hierarchical characteristic of the Style-GAN, wherein the layout corresponds to [0,2) layer of a generative network; the object corresponds to [2.6) layer of the generative network; the attribute corresponds to [6,12) layer of the generative network; and the color corresponds to [12,14) layer of the generative network; and step 3: training a plurality of latent space residual mappers, wherein since different StyleGAN layers are known to generate details of different levels in the scene image, the plurality of latent space residual mappers are divided into four groups, each group comprising a single latent space residual mapper, and the four groups are configured to correspondingly generate details of the layout, the abstract, the attribute, and the color; and realizing manipulation on a real scene image with a visual abstract text by utilizing the tertiary word $t_3$ obtained in step 1 and a contrastive language-image pre-training (CLIP) model.

2. The real scene image editing method based on hierarchically classified text guidance according to claim 1, wherein step 1 specifically comprises:

1-1, based on an image convolution network, utilizing a text encoder and a label encoder to extract text semantic $S_t$ and label semantic $S_l$, as shown in the following formulas, respectively, by sharing a hierarchical structure relationship representation E learned in a label set, wherein $V_t$ represents a set of hierarchical structure nodes; $V_l$ represents a set of label nodes; and $\sigma$ represents an activation function ReLU;

$$S_t = \sigma(E \cdot V_t)$$

$$S_l = \sigma(E \cdot V_l)$$

1-2, projecting the text semantic $S_t$ and the label semantic $S_l$ into a joint embedding space, wherein a joint embedding loss controls a similarity between the text semantic $S_t$ and the label semantic $S_l$;

1-3, by matching a learning loss, performing training to obtain a fine-grained label semantic, a coarse-grained label semantic, and incorrect label semantics, wherein the fine-grained label semantic is closest to the input tertiary word $t_3$; the fine-grained label semantic is $t_3$; the coarse-grained label semantic is $t_2$; and other incorrect label semantics are far away from the primary word $t_1$; and 1-4, with the trained hierarchical multi-label text classification model, inputting the primary word $t_1$ to obtain the desired tertiary word $t_3$ and the secondary word $t_2$.

3. The real scene image editing method based on hierarchically classified text guidance according to claim 1, wherein step 3 specifically comprises:

3-1, due to different StyleGAN layers generating details of different levels in the scene image, dividing four latent space residual mappers into four groups, which correspond to the layout, the abstract, the attribute, and the color, respectively, and providing a different part of the latent vector w for each group;

selectively training each latent space residual mapper group according to the secondary word $t_2$ obtained in step 1, wherein the latent space residual mapper groups corresponding to words not comprised in the secondary word $t_2$ are not trained;

3-2, representing the latent vector of an input image as $w = (w_l, w_o, w_p, w_c, w_0)$, wherein $w_l$, $w_o$, $w_p$, $w_c$, and $w_0$ represent divisions of w according to different layers, wherein $w_l$ corresponds to a vector part corresponding to the layout layer; $w_o$ corresponds to a vector part corresponding to the abstract layer; $w_p$ corresponds to a vector part corresponding to the attribute layer; $w_c$ corresponds to a vector part corresponding to the color layer; $w_0$ represents a residual part after the division of the latent vector w; since the StyleGAN network has a total of 18 layers, the divided groups are first 14 layers; $M(w) = (M_1(w_l), M_2(w_o), M_3(w_p), M_4(w_c), w_0)$ is obtained by the latent space residual mappers, wherein $M_1$, $M_2$, $M_3$, and $M_4$ represent groups of a mapping network, respectively;

3-3, after training the latent space residual mappers under the influence of a CLIP loss, multiplying a resulting bias vector $\Delta$ by an initial latent vector w of the image to realize editing of the latent vector w, and maintaining other semantic content in the input image unchanged, wherein the CLIP loss is capable of minimizing a cosine distance of a generated image and a text prompt:

$$L_{CLIP}(w) = D_{CLIP}(G(w + M(w)), t_3),$$

wherein G represents a StyleGAN generator; to maintain some visual attributes of the original input image, the latent space after the mapping is constrained by using an L2 norm; and therefore, a final loss function is expressed as:

$$L(w) = L_{CLIP}(w) + \|M(w)\|_2;$$

3-4, inputting the edited latent vector w+M(w) to the StyleGAN network, and finally outputting the edited image.

\* \* \* \* \*